April 21, 1970   J. A. SCOTT   3,507,712
METHOD AND APPARATUS FOR QUENCHING PIPE
Filed Sept. 8, 1967   2 Sheets-Sheet 2

INVENTOR.
JAMES A. SCOTT
By Donald G. Dalton
Attorney

United States Patent Office 3,507,712
Patented Apr. 21, 1970

3,507,712
METHOD AND APPARATUS FOR QUENCHING PIPE
James A. Scott, Mount Lebanon Township, Allegheny County, Pa., assignor to United States Steel Corporation, a corporation of Delaware
Filed Sept. 8, 1967, Ser. No. 668,991
Int. Cl. C21d *1/62, 1/60, 9/08*
U.S. Cl. 148—143         5 Claims

ABSTRACT OF THE DISCLOSURE

An improvement on the pipe-quenching method and apparatus of Patent No. 2,776,230. Apparatus includes manifold rings having spray nozzles through which pipe travels lengthwise. The sprays are directed at angles such that water is excluded from the leading ends of the pipe. The improvement consists in reversing the angles on half the rings to produce better quenching.

---

This invention relates to an improved method and apparatus for quenching large diameter steel pipes as they leave a heat-treating furnace.

My earlier Patent No. 2,776,230 shows a pipe-quenching apparatus which includes a series of axially aligned spaced manifold rings and a plurality of spray nozzles projecting inwardly from each ring. The apparatus is located where each pipe, as it leaves a heat-treating furnace, travels lengthwise through the rings with its central axis lying approximately along the central axis of the rings. The nozzles direct conical water sprays against the pipe surface. Each nozzle projects at an acute angle of about 30° from the plane of its ring toward the direction of pipe travel. I intended this arrangement to prevent water from the sprays from backing up into the furnace or contacting a pipe prematurely, but there is a problem that water gets into the leading ends of pipes and causes defects which may necessitate excessive cropping or even scrapping of whole pipes.

Schell application Ser. No. 501,347, filed Oct. 22, 1965, now Patent No. 3,407,099, covers an improvement over the invention shown in my earlier patent, to wit, a method and means for excluding water from the leading ends of the pipes. My patent shows the nozzles aimed directly at the central axis of the pipe. Schell offsets the nozzles of the first two or three rings by angles of about 3° to 8° so that the center lines of sprays emanating from the nozzles are tangential to a small imaginary circle within the pipe. The Schell invention is successful for pipes of relatively small diameter, but leads to another problem for pipes of outside diameter 24 inches or greater. With pipes of this size, it is necessary to increase the angle of offset to about 8° to 16° to exclude water from the leading ends. At such angles the sprays do not properly complete the quenching of the pipe.

An object of the present invention is to provide an improved quenching method and apparatus which exclude water from the leading ends of large diameter pipes, yet effectively quench the pipe.

A more specific object is to provide an improved quenching apparatus and method in which I overcome the foregoing problem by offsetting certain nozzles in opposite directions from the others, whereby the pipe is effectively quenched.

Figure 1:
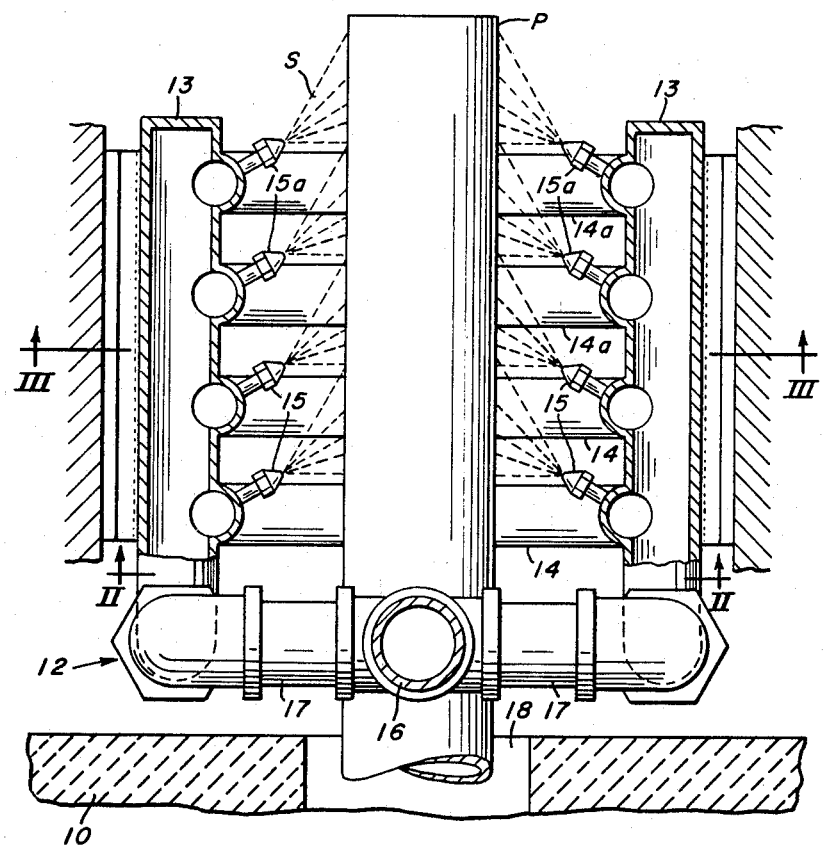
Figure 2:
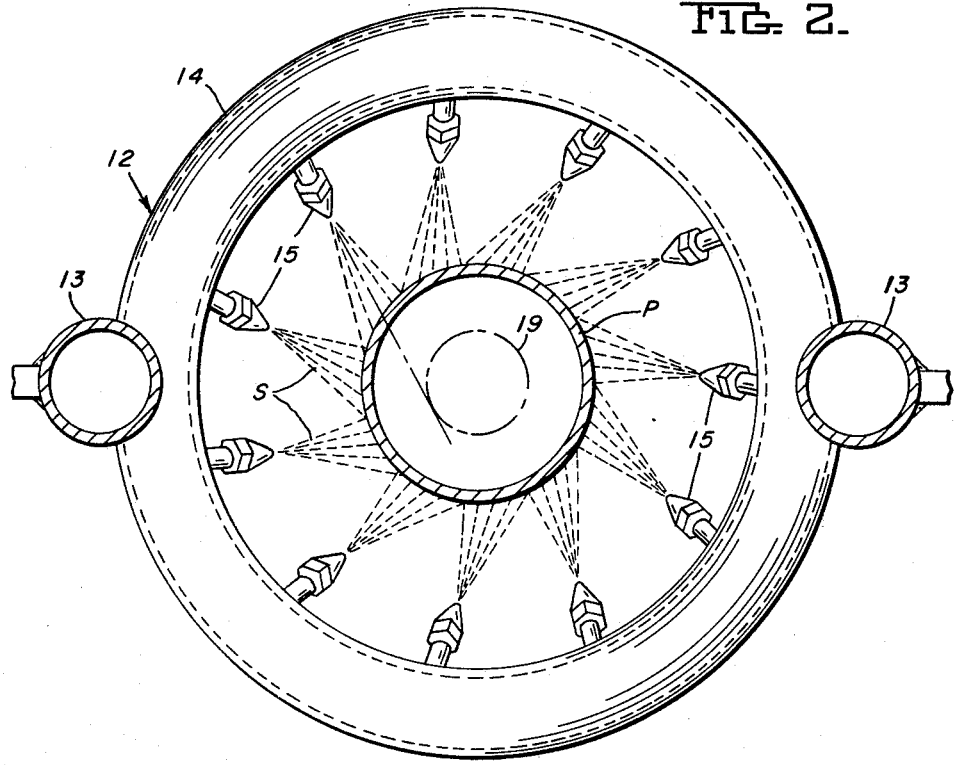
Figure 3:
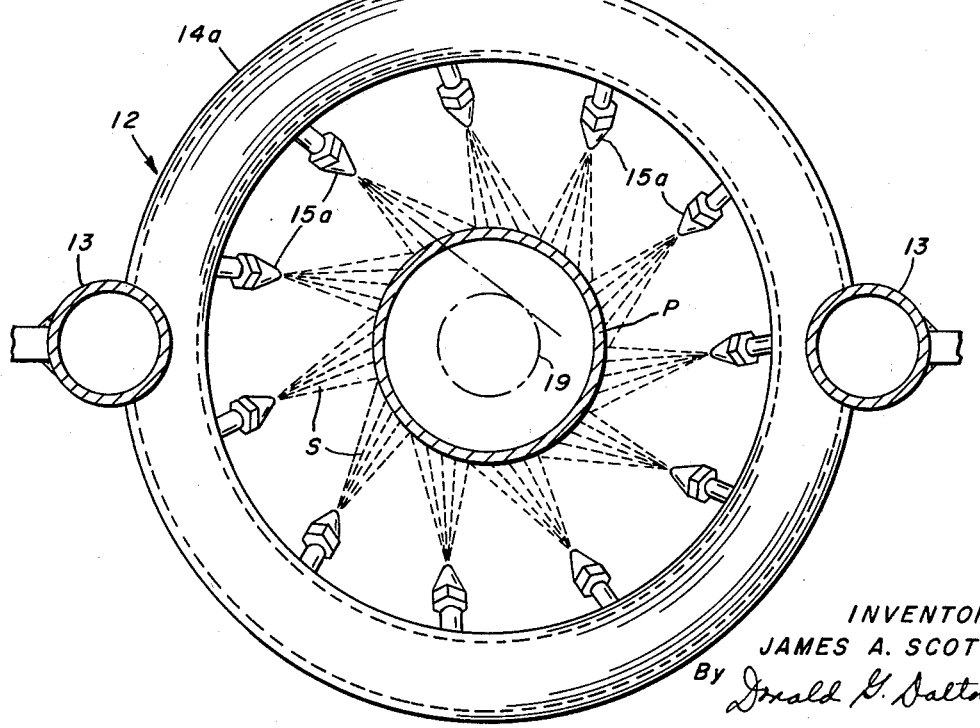

In the drawings:
FIGURE 1 is a top plan view, partly in section, of a pipe-quenching apparatus which embodies my invention with some of the nozzles omitted for clarity;
FIGURE 2 is a vertical section on line II—II of FIGURE 1; and
FIGURE 3 is a vertical section on line III—III of FIGURE 1.

FIGURE 1 shows a portion of a conventional heat-treating furnace 10 for steel pipes P of relatively large diameter (24 inches or more), and a quenching apparatus 12. The latter includes a pair of tubular headers 13, a series of axially aligned spaced parallel manifold rings 14 and 14a communicating with the headers, and nozzles 15 and 15a connected to the inner circumferences of rings 14 and 14a respectively. A water line 16 supplies water to the headers via branches 17. Heated pipes P leave the furnace through an opening 18 and travel lengthwise through the rings with their central longitudinal axes lying as nearly as possible along the central axis of the rings. Pipes of relatively small diameter preferably are rotated on their longitudinal axes as they travel through the rings to compensate for any inaccuracies in centering. Large diameter welded pipes to which the present invention applies usually are not rotated, since the equipment for rotating them would mark the weld.

Initially the pipes are at a temperature above their transformation temperature, but the nozzles emit water sprays S, preferably in the shape of solid cones, against the outside surface of the pipes to quench them below this temperature. The nozzles project at acute angles of at least 20° and preferably 30° from the planes of their respective rings in the direction of pipe travel to prevent water from backing up, as already explained. This much of the method and apparatus is similar to the showing of my earlier patent; hence I have not shown nor described it in greater detail.

My earlier patent shows nozzles aimed directly at the central axis of the rings. The center line of each conical spray is radial of and intersects this axis. After the trailing end of each pipe P leaves the furnace, there is an interval before the leading end of the next pipe appears. The sprays of course operate continuously. During intervals while there is no pipe within the sprays, most of the water travels away from the furnace, but the sprays have a small backward component, which becomes more critical the larger the pipe diameter. In the arrangement shown in my earlier patent, some water travels toward the furnace and may enter the leading end of the next pipe where it is detrimental. Once the pipe is fully within the sprays, no more water travels backward.

The method and apparatus shown in the aforementioned Schell application overcome the problem of water getting into the pipe ends by arranging the nozzles 15 as FIGURE 2 shows. Schell aims the nozzles in directions that the center lines of their sprays S are tangential to a small imaginary circle 19 which is concentric with the ring axis and of smaller radius than the pipe P. The center lines of Schell's sprays meet the radii of the rings or the extended radii of the pipes at angles of about 3° to 8°, or preferably about 4°. This angle is referred to as the angle of offset.

I have observed that Schell's arrangement becomes less effective when applied to pipes of 24 inches or greater outside diameter. To exclude water from the leading ends of the pipe, it is necssary to increase the angle of offset to about 8° to 16°. At such angles the sprays do not effectively complete the quench of the pipe without otherwise unnecessarily greatly increasing the length of the spray head and requiring much larger quantities of water. In accordance with my invention, I aim the nozzles 15 of approximately half the rings 14 so that they have an angle of offset of about 8° to 16°, or preferably about 10°, in one direction as FIGURE 2 shows. I aim the nozzles 15a of the other rings 14a so that they have approximately the same angle of offset, but in the opposite direction, as FIGURE 3 shows. The nozzles aimed in the first direction are on consecutive rings, and those aimed in the second direction likewise are on consecutive rings. I have not obtained satisfactory results by alternating the two types of rings. The angle between the nozzles and the planes of their rings should be at least 20° and preferably 30°, with the nozzles producing sprays which have an apex cone angle of about 30°, as in my earlier patent.

Actual tests have demonstrated that my invention effectively quenches pipes of large diameter, as well as preventing water from entering the leading ends of the pipe. Thus the invention overcomes both problems which are encountered with previous pipe-quenching methods and apparatus.

While I have shown and described only a single embodiment of my invention, it is apparent that modifications may arise. Therefore, I do not wish to be limited to the disclosure set fotrh but only by the scope of the appended claims.

I claim:

1. In a pipe-quenching operation in which conical water sprays are directed against the outside surface of pipes as they travel lengthwise in the direction of thier central longitudinal axes, there being an interval after the trailing end of each pipe passes before the leading end of the next arrives, said sprays emanting from points surrounding the pipes in a series of spaced parallel planes and being directed at acute angles from their planes toward the direction of pipe travel and also being offset at angles such that their center lines are tangential to imaginary circles within the pipe, the improvement which comprises reversing the angles of offset in approximately half the planes from those of the other half, the planes which have similarly offset sprays being arranged consecutively.

2. An operation as defined in claim 1 in which the angle of offset is 8° to 16°.

3. An operation as defined in claim 1 in which the pipe has an outside diameter of at least 24 inches.

4. In a pipe-quenching apparatus which includes a series of manifold rings, means supporting said rings in spaced parallel axially aligned relation to surround pipes as they travel lengthwise along the central axis of the rings, means for supplying water to said rings, and a plurality of spray nozzles connected to the inner circumference of each ring, said nozzles projecting at acute angles from the planes of their respective rings in the direction of pipe travel and being offset from the radii of the rings at angles such that the center lines of sprays emanating therefrom are tangential to imaginary circles within the pipe, the improvement which comprises reversing the angles of offset in the nozzles of approximately half the rings from those of the other half, the rings which have similarly offset nozzles being arranged consecutively.

5. An apparatus as defined in claim 4 in which the angle of offset is 8° to 16°.

References Cited

UNITED STATES PATENTS

| 2,776,230 | 1/1957 | Scott | 148—153 |
| 3,140,964 | 7/1964 | Middlemiss | 148—143 |
| 3,189,490 | 6/1965 | Scott | 148—153 |
| 3.407,099 | 10/1968 | Schell | 148—143 X |

L. DEWAYNE RUTLEDGE, Primary Examiner

G. K. WHITE, Assistant Examiner

U.S. Cl. X.R.

148—153, 157; 266—4, 6